United States Patent [19]

Baumann et al.

[11] Patent Number: 5,704,977
[45] Date of Patent: Jan. 6, 1998

[54] COATING ARRANGEMENT WITH A ROTARY ATOMIZER

[75] Inventors: Michael Baumann, Heilbronn; Harry Krumma, Bonninghelm; Frank Rupertus, Bletigheim-Bissingen; Rolf Schneider, Burgstetten; Kurt Vetter, Remseck, all of Germany

[73] Assignee: Behr Systems, Inc., Rochester Hills, Mich.

[21] Appl. No.: 513,225

[22] Filed: Aug. 10, 1995

[51] Int. Cl.⁶ .................. B05B 3/02; B05C 5/00
[52] U.S. Cl. .............. 118/323; 118/320; 239/3; 239/223; 239/224; 239/390; 239/704; 239/708; 239/DIG. 14
[58] Field of Search .............. 118/300, 323; 239/3, 223, 224, 390, 704, 708, DIG. 14; 403/13, 14, 320, 327, 337; 411/354, 393

[56] References Cited

U.S. PATENT DOCUMENTS

| | | | |
|---|---|---|---|
| 4,601,921 | 7/1986 | Lee | 118/300 |
| 4,776,520 | 10/1988 | Merritt | 239/223 |
| 4,943,178 | 7/1990 | Weinstein | 239/224 |
| 4,997,130 | 3/1991 | Weinstein | 239/224 |

FOREIGN PATENT DOCUMENTS

2278554  12/1994  United Kingdom ......... 239/223

*Primary Examiner*—Donald E. Czaja
*Assistant Examiner*—Michael Philip Colaianni
*Attorney, Agent, or Firm*—Howard & Howard

[57] ABSTRACT

For a rapid and simple assembly, the rotary atomizer of the coating arrangement described has a fastening pin (34) arranged on a valve unit (12). The fastening pin is inserted into a matching opening of a mounting flange (70) and is retained therein by a clamping device that exerts a force pressing the valve unit (12) against the flange (70). The atomizer is composed of individual modules (2,4,6,10,12) connected by screw connections and additionally comprises a rigid light guide rod for the transmission of optical rpm measuring signals, which remains in the valve unit (12) during disassembly of the atomizer.

15 Claims, 5 Drawing Sheets

COATING ARRANGEMENT WITH A ROTARY ATOMIZER

BACKGROUND OF THE INVENTION

The invention pertains to a coating arrangement with a rotary atomizer having mounting means arranged on a valve unit for the detachable mounting of the rotary atomizer.

A rotary atomizer of this type, that is used especially in electrostatically operating coating systems, e.g., for the production coating of motor vehicle bodies or other workpieces, must be mounted in a detachable and exchangeable manner on a mounting flange or other stationary mounting part. Assembly and disassembly has, heretofore, been costly, laborious and time-consuming due to the fastening construction used. Difficulties also result because during assembly and disassembly, the internal supply and discharge lines of the rotary atomizer must be connected to or disconnected from the associated external lines.

Also, in prior art systems, light transmission occurred by means of flexible fiber-optic light guides ending directly at the reflector disk. However, these known fiber-optic light guides considerably impair not only a rapid assembly of the atomizer modules, but also a rapid mounting and removal of the atomizer as a whole, particularly for the reason that they must bridge over the space occupied by the valve unit between the drive motor and mounting flange or other mounting part of the coating arrangement. The possibility does exist of guiding a light guide to the reflector disk through a rigid tube, projecting from the mounting part and bridging the aforementioned space; however, when the atomizer is removed, the tube projects in an exposed manner from the mounting part such that the danger exists of injury and damage.

The problem is thus posed of configuring the rotary atomizer such that the desirable rapid and easy assembly and disassembly of the atomizer is not impaired by the essential light signal line.

The underlying purpose of the invention is to indicate a coating arrangement with a rotary atomizer that can be assembled on and removed from a mounting part of the coating arrangement as rapidly, easily, and effortlessly as possible.

These problems are solved by the coating arrangement according to the present invention. This not only enables a rapid and simple assembly and disassembly of the atomizer, but also easily enables, due to the axial force, a good seal at junction points between internal and external lines.

SUMMARY OF THE INVENTION

The rotary atomizer of the present invention includes a spray element mounted on a rotating shaft, a drive motor for the spray element and a stationary channel body. The stationary channel body guides a coating material to be atomized or a rinsing agent to the spray element through channels running along an axis of rotation. The stationary channel body is connected to a valve unit that comprises a valve actuator for valves. The valve unit is adapted for opening and closing the channels. The valve unit also includes mounting means arranged thereon for detachable mounting of the rotary atomizer from a mounting part of the coating arrangement. A fastening pin is arranged on the valve unit having an outer surface parallel to a longitudinal axis of the pin, fitting into an opening provided in the mounting part. Additional means are provided for securing the fastening pin in the opening with a force that draws the valve unit in an axial direction against the mounting part.

A rotary atomizer of the present type shall itself be as rapid, simple and effortless as possible to both disassemble and reassemble. It is advantageous, in particular, to feature a modular configuration of the respective primary components such as the bell plate unit, the drive motor with a bearing unit for the drive shaft and the valve unit with the channel body leading to the bell plate, e.g., for colored lacquer or rinsing fluid, such that they can be detached from the other respective modules easily and rapidly and then reconnected for inspection, cleaning, and/or exchange. According to the present invention, this can possibly be in exchange for corresponding modules with different functions. This construction may result in the problem, among others, of achieving an advantageous transmission, from the rotary atomizer to an external part of the coating arrangement, of the light signal for measuring rpm commonly generated with a reflector disk of the drive motor.

Thus, in accordance with another aspect of the present invention, the coating arrangement includes a disk element of the drive motor for measuring revolutions per minute (rpm). The disk element rotates with a shaft of the spray element. The coating arrangement also includes a light guide for the rpm of corresponding light signals. An optical circuit is formed by the light guide retained by the valve unit and is detachable from the mounting part of the coating arrangement.

The part of the light guide leading through the rotary atomizer remains in the valve unit during removal of the atomizer, without danger of damage and injury, and does not represent an obstruction for the desirable rapid fastening and removal of the atomizer. The light guide, configured, in particular, as a glass rod, can be automatically coupled, preferably in an elastic manner, to an optical coupler in the stationary mounting component during mounting of the atomizer. The elastic coupling has the particular advantage that by virtue of a reliable mutual arrangement of the optically essential surfaces, the optical attenuation resistance and corresponding attenuation losses can be held to a minimum during transmission of the light signal.

These and other features of the present invention will be best understood from the following specification and drawings, of which the following is a brief description.

DETAILED DESCRIPTION OF A PREFERRED EMBODIMENT OF THE INVENTION

Figure 1:
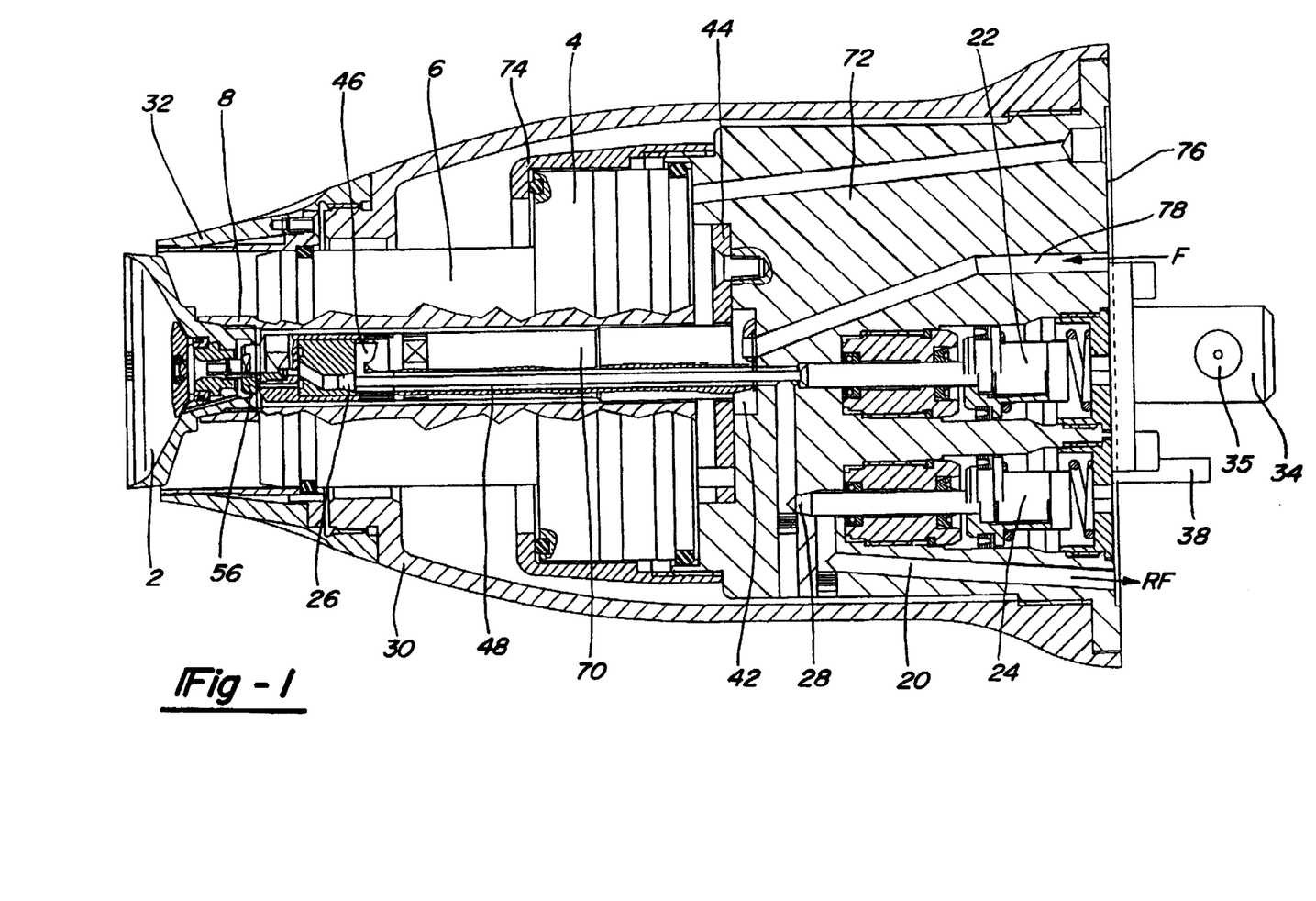
FIG. 1 is a cross-sectional view of a rotary atomizer according to the present invention.
Figure 4:
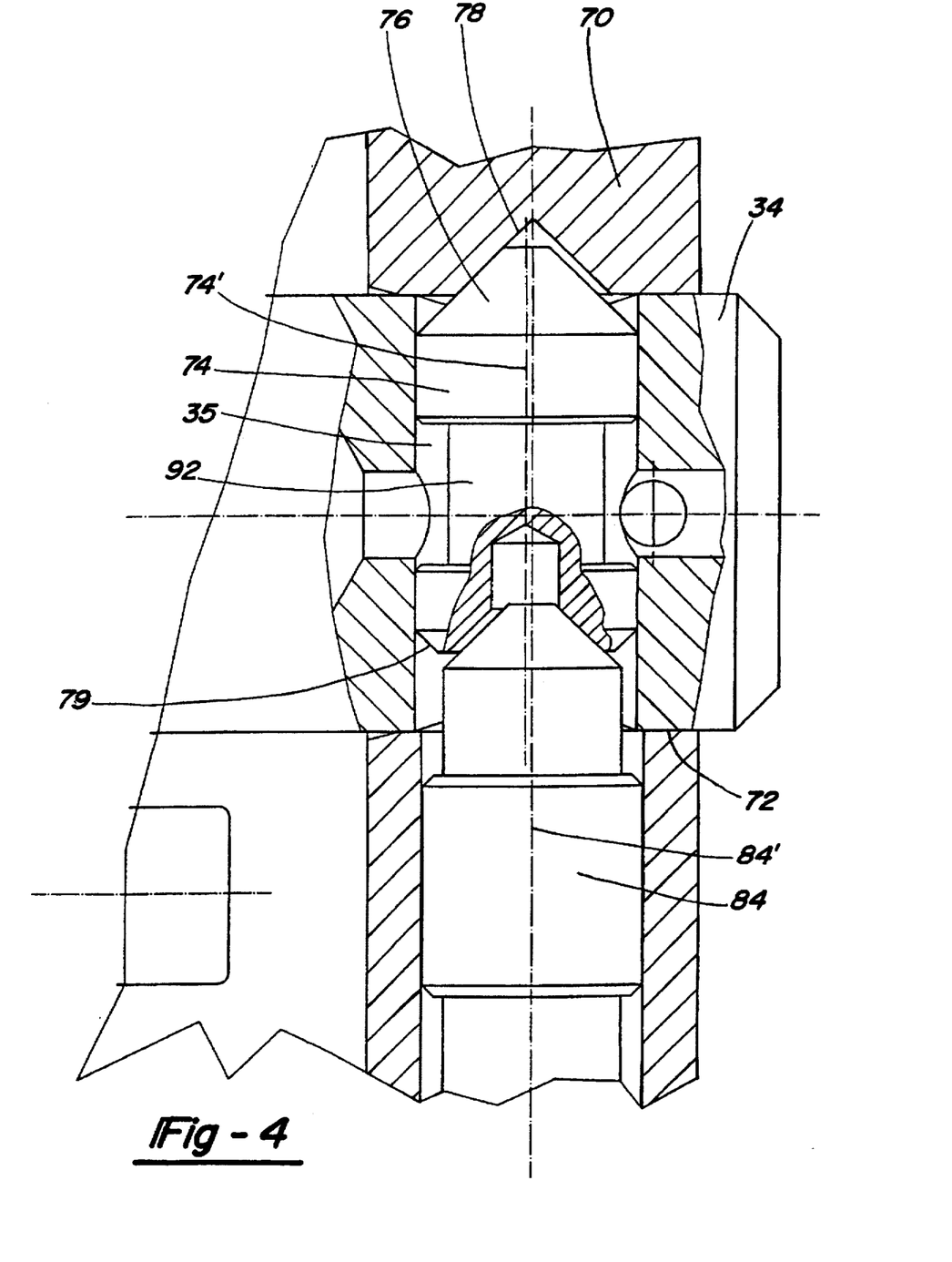
FIG. 4 is a partial cross-sectional view of the valve unit of FIG. 3.

The rotary atomizer represented in FIG. 1 is composed primarily of a bell plate unit (2), a bearing unit (6) connected to a drive motor (4), e.g., in the form of an air turbine for a sleeve shaft (8) in the front end of which is screwed the bell plate unit (2). A stationary tubular channel body (10) is arranged within the sleeve shaft (8) and passing coaxially through the bearing unit (6) and motor (4). Channel body (10), according to the operating mode of the bell plate unit (2) supplies the coating material or a rinsing fluid to be sprayed. A valve unit (12) is connected to the channel body (10). The drive motor (4) connected to the bearing unit (6) is fastened to the valve unit (12) with a union nut (14) such that it is easily detachable. The valve unit (12) is composed, essentially, of a single-piece housing, through which lead from its outer end face (16), a paint supply line (18) and a paint return line (20), as well as a rinsing agent line (19), not visible in FIG. 1, to the channel body (10) located at its opposite inner end face (FIG. 4). The housing of the valve unit (12) further comprises controllable valve actuators (22,24) for a primary needle valve (26) within the channel body (10) or for a control valve (28) adapted for opening and closing the paint return line (20) accommodated in the housing of the valve unit. The valve unit (12) also comprises a third control valve and a valve actuator for the rinsing agent line (not shown), the construction and arrangement of which can correspond to that of the control valve (28) with actuator (24). The valve actuators such as (22,24) are inserted in a removable manner in one hole respectively in the housing of the valve unit (12). These holes are accessible from the end face (16) of the housing. For other embodiments of the invention, one or more of the control valves and/or their actuators can be located outside of the rotary atomizer. A power air line also leads from the outer end face (16) of the valve unit (12) to the drive motor (4). A rigid light guide rod (38) is arranged in the valve unit (12), serving for the transmission, in a known manner, of light signals generated in accordance with the rpm.

The aforementioned, largely cylindrical primary components of the rotary atomizer are arranged within an outer cover (30), on the front end of which is connected an air guide ring (32) that ends near the circumference of the rotating bell plate unit (2). The bell plate unit (2) serving as the spray element is generally understandable to a worker of ordinary skill in this art.

Three holes progressing parallel to the axis of rotation lead through the right part, FIG. 1, of the channel body (10). These holes are disposed in an eccentric manner at a uniform distance from one another around the axis of rotation. Two of these holes (46,48) are recognizable in FIG. 1. They are directly connected to one another at the needle valve (26). The needle of the needle valve (26) extends through the hole (48) serving, e.g., as the paint return channel to the valve actuator (22). From the valve seat of the needle valve (26), a connecting channel leads into the central hole of a nozzle (56), coaxial with the axis of rotation and to the channel body (10) and threaded into the front end of the latter. The liquid paint to be atomized flows in the direction of arrow (F) in the line (18), through the hole (46), through the needle valve (26), and into the nozzle. Liquid paint not passing through the valve (26) can flow back into the coating arrangement through the hole (48) and the line (20) in the direction of the arrow (RF). The third hole (not shown) of the channel body (10) leads to an outlet that flows parallel to and eccentric with the axis of rotation and to the central nozzle hole, in the vicinity of the outlet thereof, into the interior of the bell plate unit (2), through which can be supplied, e.g., a rinsing or dilution fluid outside of the paint channels. The end face at the end flange (42) of the channel body (10), perpendicular to the axis of rotation, into which flow the three holes, is supported by an end face of the valve unit (12) into which flow the associated lines of the three holes at corresponding locations. The diameter of the part of the cylindrical channel body (40) lying in the vicinity of the end flange (42) is somewhat larger than that of the part joined thereon in the direction of the bell plate and fits with limited play in the motor (4) or in its rotor connected to the sleeve shaft (8).

Figure 2:
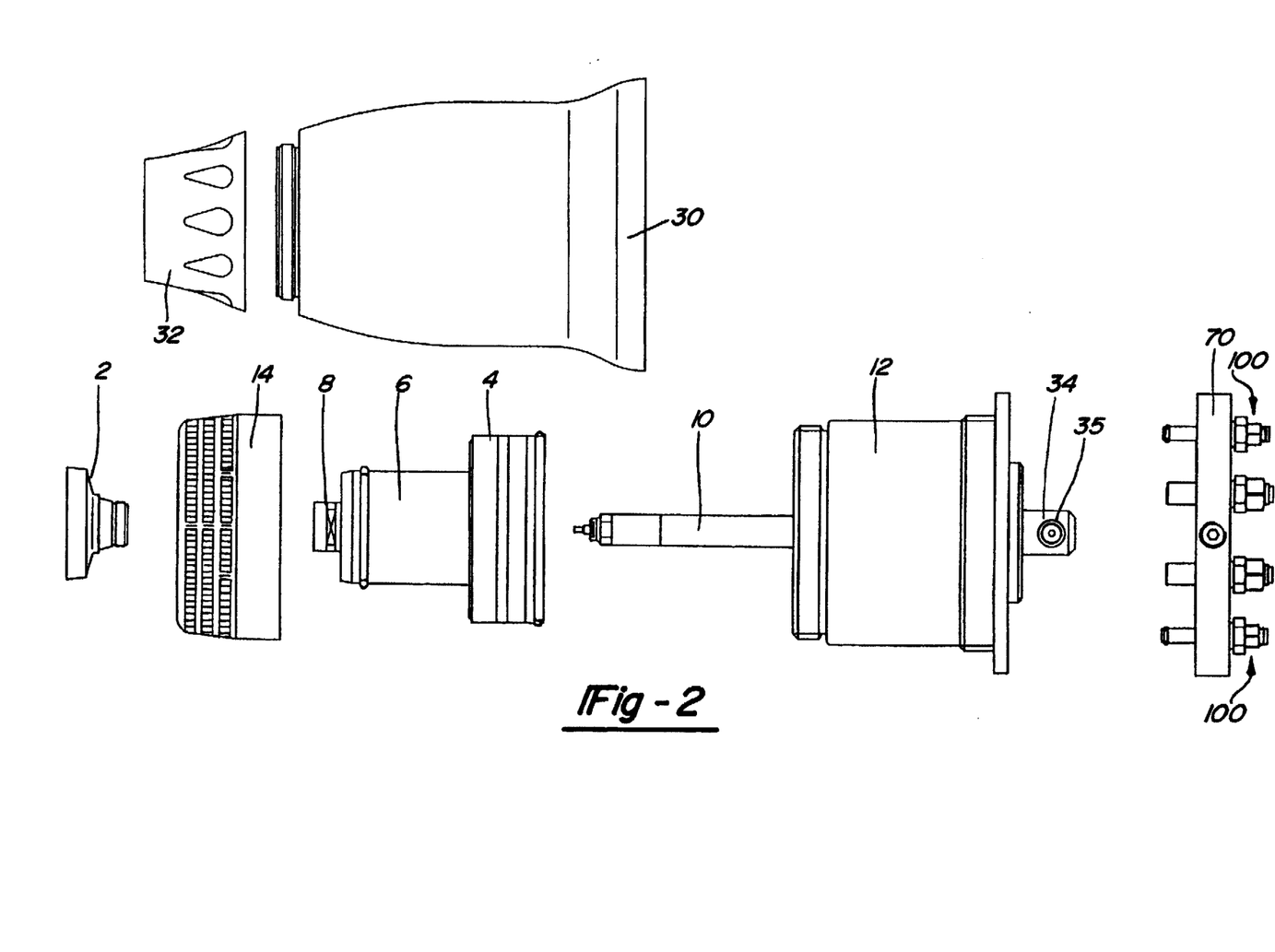
FIG. 2 is an exploded view of the rotary atomizer in FIG. 1.

The primary components of the rotary atomizer described herein, namely, the bell plate unit (2), the bearing unit (6) connected to the drive motor (4), and the valve unit (12) connected to the tubular channel body (10), are shown separately in FIG. 2. All of these parts are arranged essentially cylindrically, and coaxial with the axis of rotation. For the sake of completeness, the aforementioned cover (30) and air guide ring (32) are represented separate from the other parts. A mounting flange (70) is represented in FIG. 2 as an additional essential component that is connected in a fixed manner to the other parts of the coating arrangement and serves to fasten the valve unit (12) carrying the remaining atomizer components. As all of the modular components of the atomizer represented in FIG. 2 are held together by easily detachable screw connections, these modules may be rapidly and effortlessly detached from one another and, e.g., inspected and cleaned or exchanged, if necessary.

Figure 3:
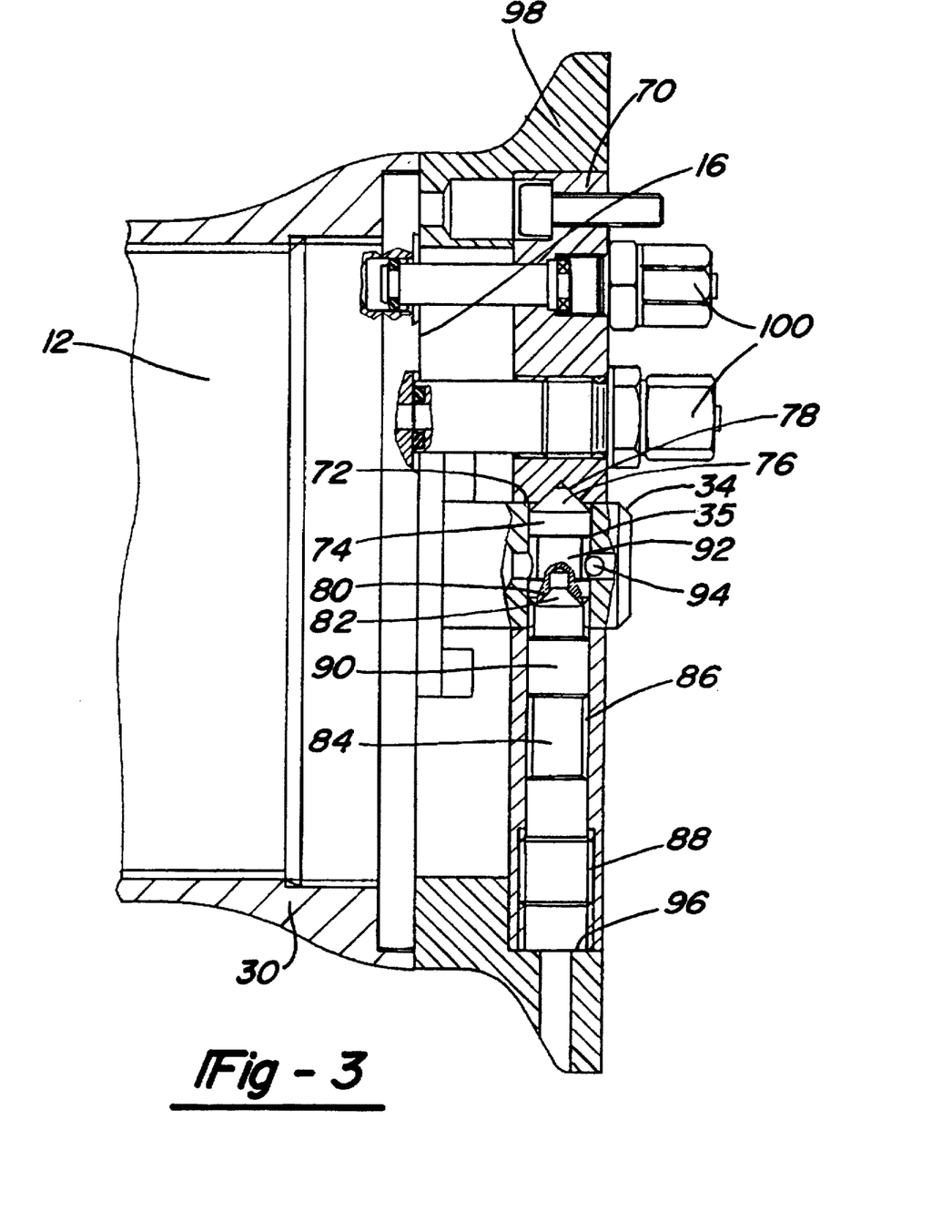
FIG. 3 is a cross-sectional view of a preferred embodiment of a valve unit of a rotary atomizer according to the present invention.

Details of the preferred construction for fastening the rotary atomizer to its mounting flange (70) are shown in FIG. 3. The mounting flange (70) has an opening (72) in which a fastening pin (34) attached in a fixed manner to the housing of the valve unit (12) coaxial with the axis of rotation fits with its outer surface parallel to the longitudinal axis of rotation. The mounting pin (34) contains a radial through-hole (35), perpendicular to the axis of rotation, into which is inserted a sliding, movable tensioning pin (74). The tensioning pin (74) has a conical point (76) at one of its end faces (upper, in FIG. 3) that engages a conical recess (78), shaped to fit the recess 80, in the wall of the opening (72) of the mounting flange (70). At its opposite end face, the tensioning pin (74) has a conical recess (80), coaxial with its point (76), which is engaged by a conical point (82), shaped to fit the recess (80), of a fastening screw (84) passing through the flange (70) parallel to the axis of both the radial through-hole (35) and the tensioning pin (74). In an alternative embodiment, the conical engagement described or an otherwise interlocking engagement could also be realized in another manner. The fastening screw (84) is seated in a hole (86) in the flange (70), which is partially provided with threads (88) and is accessible from the outside for a conventional rotary tool. The diameter of regions (90) of the fastening screw (84) located closer to the tensioning pin (74) is dimensioned such that they make sliding contact with the wall of the hole (86) and are supported by same. If the fastening screw (84) is turned in the clamping direction, its conical point (82) presses against the tensioning pin (74), that for its part is firmly pressed in the recess (78), such that the tensioning pin and consequently the fastening pin (34) are securely retained at both sides by the flange (70). In contrast, when the screw (84) is loosened, the tensioning pin (74) is released and unhindered can slide back into the radial hole (35) of the fastening pin (34) such that the latter can be easily withdrawn in an axial direction (to the left, in FIG. 3) from the opening (72).

The construction described herein shall secure the pin (34) in the opening (72) with the exertion of a force, through which the valve unit (12) is pressed in an axial direction against the flange (70) or if necessary, against the intermediate ring (98) and, in this case, against connections such as hose connections (100) attached to the flange (70), thus enabling and ensuring a good and reliable seal. For this purpose, the axis (74') of the tensioning pin (74) and of the radial hole (35) is somewhat offset, as shown in FIG. 4 (possibly only by a fraction of a mm), in relationship to the axis (84') of the fastening screw (84) parallel thereto. The axis of rotation axis (74') lies closer to the vertical unit than the axis (84'). Likewise, the center axis of the conical recess (78), advantageously corresponding with the axis of the screw (84'), is offset in relationship to the axis (74'). As a result, both the screw (84) and the recess (78) exert, when the screw (84) is tightened with its respective surfaces engaging the tensioning pin, an axial force on the pin (34) directed away from the valve unit in an axial direction and consequently toward the rotary atomizer to be assembled. The cone angle of the different end faces or recesses shall preferably be approximately 90°, such that equal axial and radial forces occur.

The tensioning pin (74) also has, on its end face opposite the conical point (76), in which is located the recess (80) for engagement with the fastening screw (84), an outer surface (79) tapering in conical fashion toward the end of the pin (FIG. 4). This conical configuration of the tensioning pin (74) at both of its end faces causes it, when the fastening pin (34) is inserted in the opening (72), to be automatically pushed by the edges of the flange (70) to its assembled position in which it is located entirely within the pin (34).

Both the tensioning pin (74) as well as the fastening screw (84) shall be seated securely in their holes and, by means of limit stops, have limited paths of displacement. For this reason the tensioning pin (74) has, between its end face sections, the diameter of which is approximately equal to the inner diameter of the radial hole (35), a center section (92) of lesser diameter. A cylindrical peg (94) projects into the space formed by this means between the center section (92) and the wall of the radial hole (35), the former limiting the movement of the tensioning pin (74). The movement of the fastening screw (84) is limited, in contrast, in the release direction by means of a limit stop (96), which is formed by a surface of an intermediate ring (98) supported by the flange (70) above the hole (86) in an axial direction, against which surface borders the head of the screw (84), with a hole for the aforementioned rotary tool leading through the intermediate ring (98). The limit stop defines the final position of the screw (84) at which a disassembly of the fastening pin (34) from the opening (72) of the flange (70) is just or most readily possible. In addition to, or in lieu of, the limit stop (96), e.g., in the absence of the intermediate ring (98), the possibility also exists of limiting the movement of the fastening screw (84) by means of a limit stop formed by means of a peg, transverse to the screw axis (not shown), passing through the plate that forms the flange (70). This peg can advantageously engage the region of the thinner center section of the screw (84) at which, according to the representation, there is a distance between the screw circumference and the inner wall of the hole (86) (similar to the case of the peg (94) at the tensioning pin (74)).

According to the present invention, the radial outer border of the mounting flange (70) is supported by the intermediate ring (98). The intermediate ring (98) is supported for its part by the end faces of the valve unit (12) facing the flange (70) and by the cover (30), defining by this means a distance of the valve unit (12) from the primary surface of the flange (70). Also incorporated into the flange (70) are the aforementioned hose connections (100) that are aligned with the openings of the paint lines (18,20) and the additional rinsing agent line as well as with the drive air line of the motor (4) in the end face (16) of the housing of the valve unit (12) and with the remaining supply and discharge lines inside the atomizer, thereby automatically producing the required line connections with insertion of the fastening pin (34) in the flange (70). For removal of the rotary atomizer from the mounting flange (70) they likewise automatically detach from the valve unit (12). As can be seen from FIG. 3 and also from FIG. 2, the hose connections (100) can project in an axial direction from the valve unit (12) and, in a sealing manner, adjoin corresponding openings at the housing of the valve unit or engage their openings.

Figure 5:
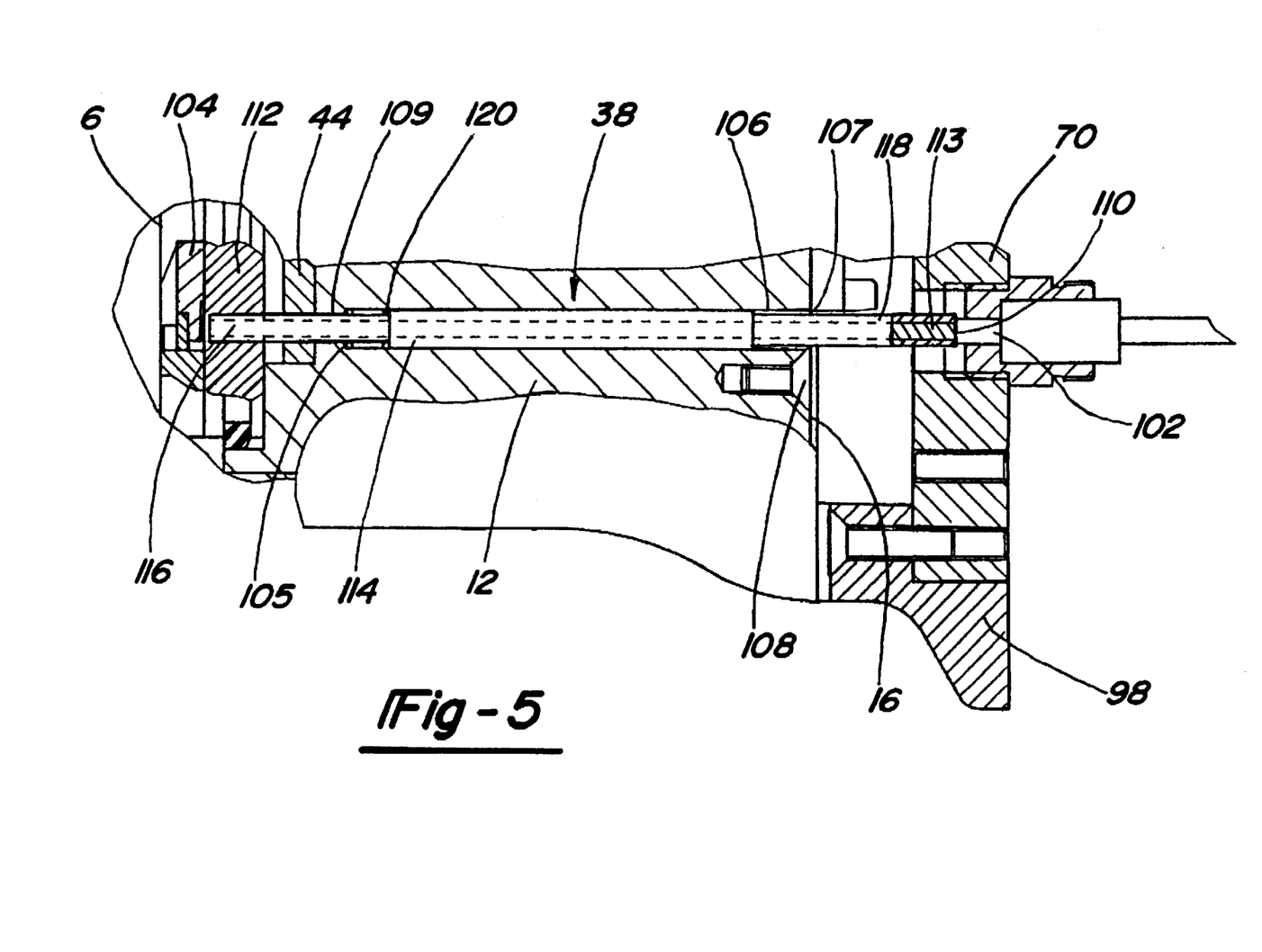
FIG. 5 is a partial cross-sectional view of a light guide in a rotary atomizer according to the present invention.

As shown in FIG. 5, an optical coupler (102) is also incorporated into the mounting flange (70), through which are to be guided optical signals, generated in the rotary atomizer for measuring rpm, to an external measuring device (not shown). The optical signals are generated in a conventional manner by a reflector disk (104) which is mounted on the turbine wheel of the drive motor (4) (FIG. 1) and which rotates with the sleeve shaft (8) mounted in the bearing unit (6). From there the signals must be transmitted to the external measuring device by bridging over the intermediate space occupied by the valve unit (12). For this purpose, a rigid light guide rod (38) is inserted in a cylindrical hole (106) leading through the housing of the valve unit (12), parallel to the axis of rotation. The left end surface, as shown in FIG. 5, faces and is a slight distance from the radial border surface of the reflector disk (104) and the opposite end face is supported by the point of separation, designated (110) of the optical coupler (102). Between the valve unit (12) and the reflector disk (104), the light guide rod (38) first passes through a mounting plate (44) which, in order to fasten the end flange (42) of the channel body (10) (FIG. 1) to the housing of the valve unit (12), is threaded to the latter and then passes through an intermediate ring (112) that defines the distance between the bearing unit (6) and the valve unit (12).

The light guide rod (38) can serve to transmit to and/or receive light from the reflector disk (104) and is composed of a preferably solid cylindrical light guide element (113), e.g., glass, that is seated to be impervious and nondetachable in a rigid cylindrical protective socket (114), e.g., of metal or plastic. The respective level end faces of the light guide element (113) and of the protective socket (114) are flush to one another at both axial ends. This structural shape also has the advantage, in comparison with fiber-optic light guides, that paint or other impurities cannot penetrate, e.g., by means of capillary action to the inside of the light guide.

According to the present invention, the hole (106) of the valve unit has a somewhat smaller diameter at its end (109) facing the reflector disk (104) than in the remaining region. The protective socket (114) of the light guide rod (38) has a center cylindrical section with a greater diameter, approximately equal to the greater inner diameter of the hole (106), and cylindrical end parts (116,118) bordering thereon on both sides, with a smaller diameter. The diameter of the end section (116) of the protective socket (114) facing the reflector disk (104) is approximately equal to the smaller diameter at the end (109) of the hole (106). At the opposite end section (118), the opening (107) of the hole (106) lying in the end face (16) of the housing of the valve unit is narrowed by the head of a check screw (108) screwed into the end face (16). The axial length of the thicker section of the protective socket (114) is somewhat less than those of the section of the hole (106) with a greater diameter, such that the stroke of motion of the light guide rod (38) mounted to be reciprocally movable in the hole (106) is limited on the one hand by the radial end face (105) in the hole (106) and on the other hand by the check screw (108). A pressure spring (120) is seated according to the representation on the end section (116) of the light guide rod (38) between the end face of the thicker section of the protective socket (114) facing the reflector disk (104) and the end face (105) of the hole (106) lying opposite the protective socket (114). If the check screw (108) is removed, the light guide rod (38) can be withdrawn from the valve unit (12), e.g., for replacement.

The arrangement shown in FIG. 5 can also be altered to the effect that the section of the hole (106) with a greater diameter reaches to the mounting plate (44), at which is supported, in this case, the pressure spring (120). The hole (106) has a section of a smaller diameter at the opposite end (right, in FIG. 5). For this alteration, the light guide rod (38) could be withdrawn from the valve housing after removal of the plate (44).

The possibility further exists of incorporating the light guide rod (106) in a fixed manner in the valve unit (12) and relocating the spring function of the pressure spring (120) in the optical coupler (102) in the flange (70).

If the rotary atomizer is removed from its mounting flange (70), the light guide rod (38) remains in the valve unit (12), only projecting a small piece of its end section from it, as can be seen from FIG. 1 at (38), such that it is protected from damage and also presents no risk of injury. If, in contrast, the rotary atomizer is inserted in the mounting flange (70), the end section (118) of the light guide rod (38) automatically adjoins the optical coupler (102) aligned with the rod (38), where it is securely and reliably pressed by compression spring (120) against the optical end face of the optical coupler (102) at the point of separation (110) with an equalization of possible structural tolerances, such that limited optical attenuation is ensured.

A preferred description of this invention has been disclosed; however, a worker of ordinary skill in the art would recognize that certain modifications come within the scope of this invention. For that reason, the following claims should be studied to determine the true scope and content of this invention.

We claim:

1. A coating arrangement having a rotary atomizer comprising a spray element mounted on a rotating shaft, a drive motor for said spray element, and a stationary channel body which guides a coating material to be atomized or a rinsing agent to said spray element through channels running along an axis of rotation and is connected to a valve unit that comprises valve actuator for valves adapted for opening and closing said channels, and mounting means arranged on said valve unit for detachable mounting of said rotary atomizer on a mounting part of said coating arrangement, characterized in that a fastening pin is arranged on said valve unit, with an outer surface of said pin parallel to a longitudinal axis of said pin fitting into an opening provided in said mounting part, and in that means are provided for securing said pin in said opening with a force that draws said valve unit in an axial direction against said mounting part.

2. The coating arrangement as recited in claim 1, characterized in that said longitudinal axis of said fastening pin coincides with said axis of rotation.

3. The coating arrangement as recited in claim 2, characterized in that said fastening pin contains a radial through-hole transverse to said longitudinal axis, and a sliding and movable tensioning pin is inserted in said radial hole, said tensioning pin engaging, with a first end face, said mounting part of said coating arrangement in an interlocking manner and, with an opposed end face, an end face of a fastening screw pushing through said mounting part of said coating arrangement in an interlocking manner, said screw pressing against said tensioning pin and being detachable therefrom, such that after said screw is detached, said rotary atomizer can be withdrawn, by said mounting means, from said opening of said mounting part of said coating arrangement.

4. The coating arrangement as recited in claim 3, characterized in that positive locking is attained by means of conical end faces coaxial with a displacement direction of said tensioning pin and correspondingly shaped recesses of said fastening screw, wherein said tensioning pin, or a wall of said opening engages said tensioning pin.

5. The coating arrangement as recited in claim 3, characterized in that an axis of said fastening screw lies parallel to an axis of said radial hole and is offset from said radial hole such that when said fastening screw engages said tensioning pin, an axial force is exerted on said tensioning pin which presses said valve unit against said mounting part.

6. The coating arrangement as recited in claim 5, characterized in that said axis of said radial hole is axially displaced from a center axis of a recess of said mounting part which is engaged with said tensioning pin.

7. The coating arrangement as recited in claim 3, characterized in that a path of displacement of said tensioning pin is limited by means of limit stops such that said tensioning pin is held securely in said radial hole.

8. The coating arrangement as recited in claim 3, characterized in that said tensioning pin has a conical configuration at both of its end faces, such that said tensioning pin is automatically brought to an assembly position, in which said tensioning pin is located entirely within said fastening pin when said fastening pin is inserted in said opening of said mounting part.

9. The coating arrangement as recited in claim 3, characterized in that a movement path of said fastening screw in a direction leading away from said tensioning pin is limited by a limit stop and in that said fastening screw is retained securely in said mounting pan, wherein said limit stop defines a final position of said fastening screw at which said fastening pin can be disassembled from said mounting pan.

10. A coating arrangement having a rotary atomizer comprising a spray element mounted on a rotating shaft, a drive motor for said spray element, and a stationary channel body which guides a coating material to be atomized or a rinsing agent to said spray element through channels running along an axis of rotation and is connected to a valve unit that comprises valve actuator for valves adapted for opening and closing said channels, and mounting means arranged on said valve unit for detachable mounting of said rotary atomizer on a mounting pan of said coating arrangement, said arrangement further comprising a disk element for measuring rpm, which rotates with said shaft and a light guide that leads from said disk element through an intermediate space required for said valve unit to the mounting part of said coating arrangement, characterized in that an optical circuit is formed by said light guide retained by the valve unit and is detachable from said mounting part, said light guide being formed by a rigid light guide element.

11. The coating arrangement as recited in claim 10, characterized in that an end face of said light guide facing away from said disk element cooperates in elastic manner with an optical coupler located in said mounting part and can be detached from said mounting part.

12. The coating arrangement as recited in claim 11, characterized in that said light guide is seated in a rigid cylindrical protective socket such that it is impervious and nondetachable.

13. The coating arrangement as recited in claim 12, characterized in that said protective socket has a center cylindrical section with a greater diameter and cylindrical end sections with a smaller diameter bordering on both sides, in that said center section is seated to be movable and sliding in a cylindrical hole of said valve unit, onto which is connected, at both sides, a narrowed opening or hole respectively for accommodating the end sections such that the stroke of movement of the thicker section of the protective socket is limited by the narrowed opening or hole, and in that a pressure spring is seated on the end section of the protective socket facing the disk element between the end face of the thicker section of the protective socket and the border at the circumference of the narrowed opening or hole facing the protective socket.

14. The coating arrangement as recited in claim 10, characterized in that said light guide element is retained along its axis to be movable in the valve unit between two boundary positions defined by a limit stop and is pressed by a spring in a direction facing away from the disk element.

15. The coating arrangement as recited in claim 14, characterized in that connections are incorporated in said mounting part of said coating arrangement that are aligned with openings of supply and discharge lines leading through the valve unit in the end face of a housing of the valve unit facing the mounting part and, when the atomizer is mounted on the mounting part, said openings automatically produce a connection of the internal supply and discharge lines to external connection lines and automatically break this connection upon removal of the atomizer from the mounting part.

* * * * *